United States Patent
Dimitrov

(10) Patent No.: US 11,748,776 B2
(45) Date of Patent: Sep. 5, 2023

(54) SYSTEMS AND METHODS OF GENERATING CONTEXT SPECIFICATION FOR CONTEXTUALIZED SEARCHES AND CONTENT DELIVERY

(71) Applicant: STACKADAPT, INC., Toronto (CA)

(72) Inventor: Nedialko Dimitrov, Toronto (CA)

(73) Assignee: STACKADAPT INC., Toronto (CA)

( * ) Notice: Subject to any disclaimer, the term of this patent is extended or adjusted under 35 U.S.C. 154(b) by 0 days.

(21) Appl. No.: 17/172,689

(22) Filed: Feb. 10, 2021

(65) Prior Publication Data

US 2021/0256568 A1 Aug. 19, 2021

Related U.S. Application Data

(60) Provisional application No. 62/978,746, filed on Feb. 19, 2020.

(51) Int. Cl.
*G06Q 30/0251* (2023.01)
*G06Q 30/0241* (2023.01)
(Continued)

(52) U.S. Cl.
CPC ..... *G06Q 30/0255* (2013.01); *G06F 16/9532* (2019.01); *G06F 18/2113* (2023.01); *G06F 18/22* (2023.01); *G06N 7/01* (2023.01); *G06Q 30/0276* (2013.01); *G06V 10/761* (2022.01); *G06V 10/771* (2022.01)

(58) Field of Classification Search
None
See application file for complete search history.

(56) References Cited

U.S. PATENT DOCUMENTS

| | | | |
|---|---|---|---|
| 9,201,876 B1* | 12/2015 | Kumar | G06F 40/284 |
| 2011/0213655 A1* | 9/2011 | Henkin | G06Q 30/00 |
| | | | 707/E17.061 |

(Continued)

FOREIGN PATENT DOCUMENTS

WO    WO-2011/020076 A2    2/2011

OTHER PUBLICATIONS

Bhatia et al., "Targeted advertising using behavioural data and social data mining," 2016 Eighth International Conference on Ubiquitous and Future Networks (ICUFN), 2016, pp. 937-942. (Year: 2016).*

(Continued)

*Primary Examiner* — Christopher B Tokarczyk
(74) *Attorney, Agent, or Firm* — FOLEY & LARDNER LLP

(57) ABSTRACT

Systems and methods described herein may generate campaigns and efficiently calculate bids for placement of campaign data into Internet data. Embodiments may calculate context scores for campaign data based on campaign terms and beacon terms. The context scores may be used to identify Internet content that has a high page score. If the page score of particular Internet content exceeds a predetermined threshold, the system may place a bid for a campaign based on disclosed algorithms taking as inputs performance scores, context scores, page scores, campaign budgets, and other parameters. The systems therefore are capable of quickly and effectively calculating optimal bids to place for a particular campaign given parameters disclosed herein.

20 Claims, 8 Drawing Sheets

(51) Int. Cl.
*G06F 16/9532* (2019.01)
*G06F 18/22* (2023.01)
*G06F 18/2113* (2023.01)
*G06N 7/01* (2023.01)
*G06V 10/74* (2022.01)
*G06V 10/771* (2022.01)

(56) References Cited

U.S. PATENT DOCUMENTS

| | | | |
|---|---|---|---|
| 2011/0270672 A1* | 11/2011 | Hillard | G06Q 30/0246 705/14.42 |
| 2012/0215622 A1 | 8/2012 | Ramer et al. | |
| 2014/0279773 A1 | 9/2014 | Chen et al. | |
| 2016/0110774 A1* | 4/2016 | Ahn | G06Q 50/12 705/15 |
| 2017/0098236 A1* | 4/2017 | Lee | G06Q 10/067 |
| 2017/0243243 A1* | 8/2017 | Kosai | G06Q 30/0277 |
| 2019/0065594 A1 | 2/2019 | Lytkin et al. | |

OTHER PUBLICATIONS

Carpineto et al., "A Survey of Automatic Query Expansion in Information Retrieval," ACM Computing Surveys, vol. 44, No. 1, Article 1, Jan. 2012, 50 pages.

International Search Report and Written Opinion for PCT Appln. Ser. No. PCT/CA2021/050163 dated Apr. 22, 2021 (14 pages).

Jakubowski, Alexandra, "The Future of Contextual Advertising? Page Context AI!", StackAdapt, Jan. 25, 2021, retrieved Apr. 21, 2021 from URL: https://blog.stackadapt.com/contextual-advertising/ (4 pages).

International Preliminary Report on PCT Application PCT/CA2021/050163, dated Sep. 1, 2022 (11 pages).

* cited by examiner

SYSTEMS AND METHODS OF GENERATING CONTEXT SPECIFICATION FOR CONTEXTUALIZED SEARCHES AND CONTENT DELIVERY

CROSS-REFERENCE TO RELATED APPLICATION

This application claims priority U.S. Provisional Application No. 62/978,746, filed Feb. 19, 2020, which is incorporated by reference in its entirety.

TECHNICAL FIELD

This application relates generally to systems and methods for generating contextual search parameters and delivering high-context content across a distributed network. More specifically, it relates to allowing content providers to efficiently identify contextually relevant content publishers and distributors for particular content.

BACKGROUND

Prior art systems allow for connecting content from content campaigns with content distributors based on a set of keywords using keyword targeting. For example, a search engine may sell ads to appear when search requests contain specified keywords. This basic method provides a relatively poor experience in which content to be distributed is often irrelevant to the search. For example, a content generator wanting to distribute information related to apple pies and bakeries may want to search for and publish their content on websites based on the keyword "apple," yet the content could be inadvertently placed on technology or business websites discussing the tech company of the same name, Apple®, because such sites will also contain the "apple" keyword.

A second method for specifying contexts in which to place advertisements is through some pre-established categorization related to the content to be distributed, such as Interactive Advertising Bureau (IAB) categories. In this method, publishers and content providers classify their domains or articles in pre-defined IAB categories. A content generator (e.g., advertiser) then selects the categories with which the content generator would like to collocate their content. However, with this method, the content generators are limited to selecting from only those predefined categories, and there are competing incentives between content generators and content publishers/providers, such that content publishers/providers may want to place their articles or other material in as many or as few categories as possible, which can overly-limit or oversaturate the delivery of the collocated content belonging to the content generator. Other than specifying large lists of keywords, or selecting an IAB category, there is no known way of specifying the context in which content (e.g., advertisements) of the content generators should appear. In addition, there is no known way to efficiently deliver such content to a specified context, once that context is specified by the content generator.

What is therefore needed is a more effective and efficient means for specifying a context in which content should appear and efficiently delivering content to contextually relevant web sites for collocation and presentation.

SUMMARY

The systems and methods disclosed herein are intended to address the shortcomings in the art mentioned above, but may also provide additional or alternative benefits as well. As described herein, the systems and methods may use context terms to improve correlation between campaign content with Internet content. These systems and methods allow an advertiser to specify the context in which they would like their advertisements to appear and to deliver the advertisements to sites having that context.

The improved systems and methods disclosed herein include one or more machine-learning techniques and algorithms that perform a complex algorithm to preprocess a very large number (e.g., thousands, millions) of pieces of Internet content, such as websites, videos, or audio files, to determine the best opportunities for a campaign to bid on to provide impressions. Context terms or campaign terms may be keywords or phrases, or other means of identifying content, such as digital fingerprints of audio or visual files. For example, an image of a hurricane could have a digital fingerprint known to be a hurricane, and could be assigned the keyword "hurricane." Campaign content may include advertisements, such as sales of consumer electronics and magazine subscriptions, or promotional material, such as a political campaign or a call to action. Current systems are unable to connect efficiently and effectively a large number of campaign content with Internet content. Internet content includes online videos, news articles, blog posts, real-time video feeds, online forums, social networks, online magazines, games, mobile software applications, or Internet of Things (IOT) appliances, such as smart displays, that display content. Much of this Internet content may be produced in real time, such as new videos, blog posts, articles, or forum content, and the computerized systems and methods of this application are able to connect such real-time impression opportunities with campaigns. The improved systems and methods disclosed in this application allow for higher relevance and better results by storing information in databases that may provide real time decision making between campaigns and placement adjacent to Internet content. The improved match between the advertisements and the context in which they appear are likely to result in higher performance of the advertising campaigns.

In an embodiment, a computer-implemented method comprises applying, by a computer, a machine-learning model to a first set of context terms received from a client device to output a set of beacon terms from a corpus database, wherein the machine-learning model is trained on a plurality of corpus terms stored in the corpus database to determine a plurality of co-occurrence probabilities corresponding to the plurality of corpus terms; calculating, by the computer, a plurality of page scores for a plurality of corpus webpages stored in the corpus database based upon the set of beacon terms and the first set of context terms; identifying, by the computer, in the plurality of corpus webpages a set of contextual webpages having page scores satisfying a threshold; applying, by the computer, the machine-learning model to the first set of context terms and a second set of context terms received from the client device to output an updated set of beacon terms; calculating, by the computer, one or more updated page scores for one or more corpus webpages stored in the corpus database based upon the updated set of beacon terms, the first set of context terms, and the second set of context terms; updating, by the computer, the set of contextual webpages based upon the one or more updated page scores; and storing into a campaign database, by the computer, campaign data of a user comprising the set of updated set of beacon terms and the set of contextual webpages, the campaign data configured for executing a real-time bidding selection operation for one or more available webpages during the real-time bidding selection operation.

In another embodiment, a system comprising a corpus database comprising non-transitory storage medium configured to store at least a portion of a plurality of Internet content data corresponding to a uniform resource locator (URL) and page context score; a campaign database comprising non-transitory storage medium configured to store campaign data for a plurality of users, the campaign data configured for executing a real-time bid-ding selection operation for one or more available webpages during the real-time bidding selection operation; and a server comprising a processor configured to: apply a machine-learning model to a first set of context terms received from a client device to output a set of beacon terms from a corpus database, wherein the machine-learning model is trained on a plurality of corpus terms stored in the corpus database to determine a plurality of co-occurrence probabilities corresponding to the plurality of corpus terms; calculate a plurality of page scores for a plurality of corpus webpages stored in the corpus database based upon the set of beacon terms and the first set of context terms; identify in the plurality of corpus webpages a set of contextual webpages having page scores satisfying a threshold; apply the machine-learning model to the first set of context terms and a second set of context terms received from the client device to output an updated set of beacon terms; calculate one or more updated page scores for one or more corpus webpages stored in the corpus database based upon the updated set of beacon terms, the first set of context terms, and the second set of context terms; update the set of contextual webpages based upon the one or more updated page scores; and store, into the campaign database, campaign data of a user comprising the set of beacon terms and the set of contextual webpages, the campaign data configured for executing a real-time bidding selection operation for one or more available webpages during the real-time bidding selection operation.

In another embodiment, A computer readable medium containing machine-executable program instructions, wherein execution of the program instructions by one or more processors of a computer system causes the one or more processors to execute the steps of: applying a machine-learning model to a first set of context terms received from a client device to output a set of beacon terms from a corpus database, wherein the machine-learning model is trained on a plurality of corpus terms stored in the corpus database to determine a plurality of co-occurrence probabilities corresponding to the plurality of corpus terms; calculating a plurality of page scores for a plurality of corpus webpages stored in the corpus database based upon the set of beacon terms and the first set of context terms; identifying in the plurality of corpus webpages a set of contextual webpages having page scores satisfying a threshold; applying the machine-learning model to the first set of context terms and a second set of context terms received from the client device to output an updated set of beacon terms; calculating one or more updated page scores for one or more corpus webpages stored in the corpus database based upon the updated set of beacon terms, the first set of context terms, and the second set of context terms; updating the set of contextual webpages based upon the one or more updated page scores; and storing, into a campaign database, campaign data of a user comprising the set of beacon terms and the set of contextual webpages, the campaign data configured for executing a real-time bidding selection operation for one or more available webpages during the real-time bidding se-lection operation.

Both the foregoing general description and the following detailed description are examples and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
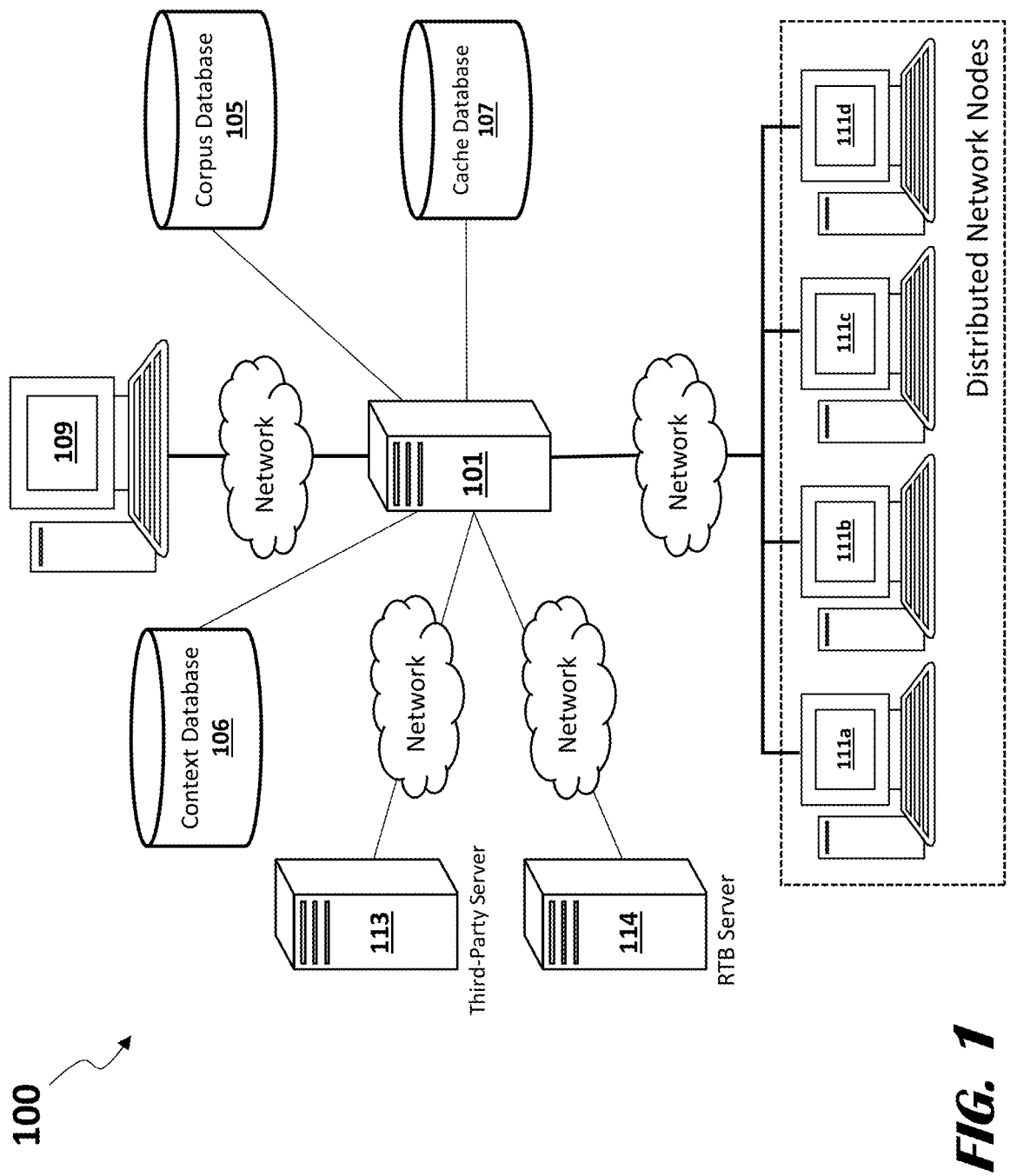
FIG. 1 illustrates components of a distributed computer system for delivery of content, according to an embodiment.

Reference will now be made to various embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

It should be appreciated that embodiments described herein are merely illustrative for the purposes of exemplifying the technology, technical components, and processes disclosed herein. In particular, the various embodiments described herein contemplate an advertising and real-time bidding (RTB) implementation of the disclosed technology and features. However, some embodiments may implement aspects of the disclosed technology for other purposes or circumstances, such as building and deploying search queries in real-time data retrieval and archiving or for querying digitized data libraries.

FIG. 1 shows components of a distributed computer system 100 for delivery of campaign content for display with Internet content, according to one embodiment. The illustrated system 100 may comprise a webserver 101, databases 105, 106, 107, an administrator device 109, distributed clients 111, third-party content servers 113, and a real time bidding (RTB) server 114. Embodiments may comprise additional or alternative components or omit certain components from those of FIG. 1, and still fall within the scope of this disclosure. Certain components of the system 100 may be embodied in multiple computing devices. For instance, the webserver 101 (or other servers) is shown as a single computing device but may include any number of computing devices. Additionally or alternatively, certain components may be integrated and embodied in the same computing device. For instance, the corpus database 105 may be hosted on the same computing device as the webserver 101.

The webserver 101 executes software programming to crawl third-party content servers 113 to extract and download various types of webpage data, including content and metadata. The webserver 101 associates the content with specific context terms, such as keywords or beacon terms. The webpage data or content may include, for example, metadata, fingerprints for media of the webpage, webpage or server identifiers, content tags, or content containing or associated with such context terms. The webserver 101 may identify fingerprints of, for example, known images or video content that is pre-correlated with the context terms. As an example, Internet content on third-party content server 113 could contain known images of maps, and webserver 101 may associate that content with maps generally, or specific maps depending on the images, e.g., Asia or North America. As such, the webserver 101 may later correlate campaign content with the map content if relevant to each other by having a context score over a predetermined threshold, as explained further below.

The webserver 101 may also host a website accessible to end-users, such as those at distributed clients 111. The website may allow the users to define and execute a campaign according to embodiments of this disclosure. For example, the webserver 101 may correlate the campaign content as a function of the various Internet content. The webserver 101 may be any computing device comprising a processor and non-transitory machine-readable storage capable of executing the various tasks and processes described herein. Non-limiting examples of such computing devices may include workstation computers, laptop computers, server computers, laptop computers, and the like. While the example system 100 includes a single webserver 101, some embodiments of the webserver 101 may include any number of computing devices operating in a distributed computing environment.

The webserver 101 may execute software applications configured to host a web site (e.g., Apache®, Microsoft IIS®), which may generate and serve various webpages to client devices 111. The client-facing website may be used to generate and access data stored on system databases 105, 106, 107 of the system 100, or execute various instructions from client devices 111, an administrator device 109, or another device of the system 100. In some implementations, the webserver 101 may be configured to require user authentication based upon a set of user authorization credentials (e.g., username, password, biometrics, cryptographic certificate). In such implementations, the webserver 101 may access system databases 105, 106, 107 configured to store user credentials, which the webserver 101 may be configured to reference to determine whether a set of entered credentials (purportedly authenticating the user) match an appropriate set of credentials that identify and authenticate the user. Similarly, in some implementations, the webserver 101 may generate and transmit software code for webpages to a client device 111 based upon a user role within the system 100 (e.g., administrator, campaign content provider, or Internet content provider).

In operation, the webserver 101 (or other computing device of the system 100) executes software programming for training and deploying one or more machine-learning models and related machine-learning algorithms. The machine-learning operations may include any processor-executed machine-learning techniques and algorithms, such as various types of neural networks (e.g., convolutional neural networks (CNNs), deep neural networks (DNNs)), linear regression, logistic regression, k-means, k-nearest neighbors (kNN), or support vector machines (SVMs), among others. The crawler program executed by the webserver 101 automatically traverses any number of URLs and downloads the webpage data (e.g., content, metadata) for the webpage. The webserver 101 stores some or all of the webpage data into a corpus database 105. The webserver 101 trains the machine-learning model on the corpus of webpage data to identify and generate various statistical associations between terms, phrases, metadata, or other information indicating the nature or context of each particular webpage. The machine-learning model determines co-occurrences and other statistical contextual data for various types of webpage data in the corpus database 105. For instance, the webserver 101 can apply any number of natural language processing and vectorization machine-learning algorithms on the content or metadata of webpages to generate feature vectors for various corpus terms in order to extract embeddings representing various statistical measures of the corpus terms. These similar algorithms can be applied to inputted context terms (e.g., in-context terms, out-of-context terms) to extract embeddings for the user's context terms, which the webserver 101 can use to determine a distance from the corpus terms and generate a context score for each of the user's context terms based on the distances. User feedback and/or additional context terms can be ingested to adjust embeddings, and/or adjust various algorithmic weights. The webserver 101 may execute additional or alternative natural language processing and vectorization machine-learning algorithms on corpus webpages for generating page scores, which represent, for example, the number of instances that certain beacon terms (e.g., terms extracted from the corpus database having a short distance from the user's in-context terms) occur in webpage content and/or in-context terms occur in the webpage content.

Once trained, the machine-learning model is prepared to ingest a set of terms/phrases from end-users building a contextualized campaign or query. The webserver 101 receives the set terms/phrases from a client device 111 and applies the trained machine-learning model on the set of input terms. The machine-learning model determines the co-occurrence probabilities (and/or other statistical measures) that the input terms co-occur with the corpus terms. The machine-learning model then outputs the corpus terms/phrases having probabilities satisfying a co-occurrence threshold. The webserver 101 may then present these terms/phrases to the end-user via a GUI, such as a webpage presented on a browser of a client device 111.

The end-user can send feedback or other instructions to the webserver 101, which the webserver 101 can use to further train and develop the machine-learning model for the particular end-user. The webserver 101 receives the feedback from the end-user indicating whether a particular term should be given more or less weight (e.g., in-context, out-of-context). The webserver 101 then re-applies the trained machine-learning model on each set of input terms received from the client device 111, adjusting the scored weights assigned to terms in accordance with the user feedback. When the machine-learning model is trained and tuned for the end-user's context, the webserver 101 then applies the machine-learning model on a bid stream of URLs for available webpages received from a RTB server 114, as further detailed in FIGS. 2-4. In some embodiments, these machine-learning operations are executed for training and executing a machine-learning model for identifying contextual webpages relative to context terms produced based on the input terms.

The system databases 105, 106, 107 may be hosted on computing devices comprising a non-transitory machine-readable storage medium and capable of performing the various tasks described herein. As shown in FIG. 1, the system databases 105, 106, 107 may be accessed by a webserver 101 via one or more networks. The system databases 105, 106, 107 may be hosted on the same physical computing device functioning as a webserver 101 and/or serving additional or alternative functions (e.g., application server, authentication server). The system 100 may include any number of public and/or private networks with various hardware and software components configured to interconnect components of the system 100 and host data communications. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

A corpus database 105 stores webpages and related metadata. The corpus database 105 may be continually updated by the crawler software program executed by the webserver 101 or other device at a given interval. In some cases, the corpus database 105 may be updated during or after bid-time, where the webserver 101 or other device detects a previously unseen uniform resource locator (URL) and triggers the crawler routine to scrape the webpage at that URL and store the webpage and related metadata into the corpus database 105. Each URL or webpage may be stored with a timestamp, URL, and content tag for later processes. The webserver 101 may access and query the data records in the corpus database 105 when executing various processes, as described herein, for building a contextualized search for a content generator end-user.

A context database 106 stores end-user specific information related to the contextualized search, after the end-user has constructed the contextualized search. For instance, the webserver 101 stores context beacon phrase scores (or other data values) into the context database 106 after being calculated or generated by the webserver 101. At bid-time, the webserver 101 accesses the data records for the end-user to determine how to compete for certain URLs published by the RTB server 114. In some implementations, the data records may be moved from a hard disk of the context database 106 to memory of the webserver 101 to improve access speed.

A cache database 107 stores frequently requested webpages and related metadata, which the webserver 101 accesses at bid-time to determine how to compete for certain URLs. The data records of the webpages stored in the cache database 107 may be "content-only" versions, having various forms of media, third-party content, or other non-content related data removed. The data records for the webpages may also include an indicator of beacon phrases and frequency scores of the beacon phrases on the webpages. The cache database 107 is generated by software routines that pull and convert certain webpages stored in the corpus database 105 into content-only versions that are then stored into the cache database 107. For instance, when the RTB server 114 publishes a URL a certain number of times, or when the URL has never been seen before, the software routine loads that URL into a queue for pre-processing conversion and storage into the cache database 107, thereby allowing the URL to be quickly accessible to the webserver 111 for executing various processes described herein at some later bid-time.

Figure 2:
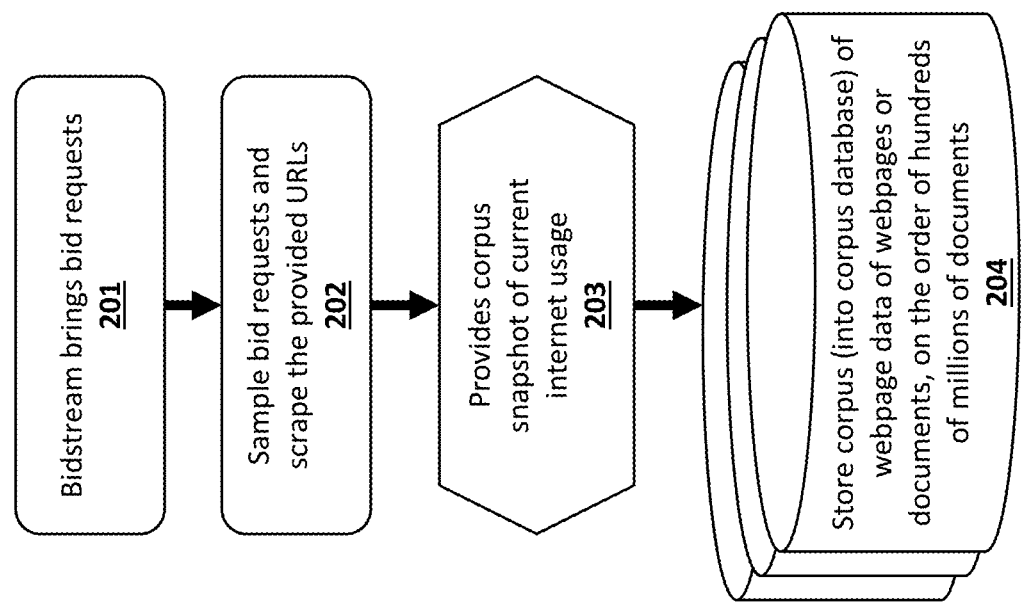
FIG. 2 illustrates a flow chart for generating a corpus of documents recent Internet content that may place content.

The administrator device 109 executes various software programming allowing an administrator-user to maintain, improve, and webserver 101. The administrative device may be any computing device comprising hardware (e.g., processor, non-transitory storage media) and software components and capable of performing the various tasks and processes described herein. In operation, the administrator device 109 may manually (according to user inputs) or automatically (according to user configurations) initiate an operation to build a corpus of webpage data or documents for use in a future campaign, as illustrated in FIG. 2. The administrator may also configure the administrator device 109 to execute various tasks that aid the administrator with maintaining quality control. For instance, the administrator may review associations of the corpus webpage data or documents and the context terms to ensure proper correlation. This process may also occur via programmatic means in certain embodiments of this disclosure.

The RTB server 114 may be one or more computing devices of an RTB system that hosts a webportal, or other web-based external service, that publishes and manages competitions among content generators to compete for opportunities to deliver content on various webpage URLs. In some embodiments, the RTB server 114 transmits or otherwise publishes the URL of a particular webpage that is received by the webserver 101. The content generators (e.g., end-users), using client devices 111, generate a contextual specification that informs the webserver 101 which URLs are of interest for the content generators. The webserver 101 then automatically initiates transactions with the RTB server 114 for those URLs that have a higher-contextual relevance to a content generator, based on the contextual specification of that particular content generator. The content is then forwarded to a third-party server 113 hosting the URL for publication and display over the Internet.

It should be appreciated that, although the RTB server 114 in the example embodiments herein is associated with an advertising-centric RTB service, the RTB service is merely illustrative and non-limiting. Other embodiments may involve any third-party external web-service that publishes information (e.g., API service) and instructions (e.g., API requests) for executing various tasks described herein. Likewise, an API service (e.g., bidstream) may be any remote data publication service that generates and publishes data to subscribing computing devices for data consumption and executing processes associated with the API service. An API request (e.g., bid request) may include computer-implemented instructions to execute one or more processes associated with the API service, such as gathering and responding with requested data or generating a GUI to display data that is being published.

In the example embodiments, a bidstream is a data stream of published URLs available for bids to content generators interested in placing campaign content at those URLs; and a bid request may be the computer-implemented instructions to the computer to display and/or distribute those URLs and gather bid inputs corresponding to the published URLs, which thereby trigger the computer to execute various processes described herein to generate and submit the inputted data to the API service via the API request.

FIG. 2 shows a flowchart of execution steps for a webserver to build a corpus of documents (e.g., webpages) for placement of future campaign content, according to an example method 200 embodiment. Although the method 200 is described with respect to a single computing device and a single database, it should be appreciated that any number computing devices may be involved in other embodiments, including additional or alternative computing devices from the webserver and corpus database. It should also be appreciated that certain embodiments may provide for additional or alternative steps, or omit certain steps, from the steps of the method 200, and still fall within the scope of this disclosure.

In step 201, a computer (e.g., webserver 101) hosting a webserver application identifies an API service (e.g., bidstream) associated with a real-time bidding (RTB) system to invoke and access. Using the selected API, the computer receives and transmits API requests (e.g., bid requests) to and from an RTB server and/or client computers. As mentioned, an API service may be any remote data publication, query, and/or archiving executable service that generates and publishes data to subscribing computing devices, which consume the published data and execute various processes associated with the API service. An API request may include computer-implemented instructions to execute one or more processes associated with the API service, such as gathering and responding with requested data or generating a GUI to display data that is being published.

In the method 200, a bidstream is a data stream of published URLs available for bids to content generators interested in placing campaign content at those URLs; and a bid request may be the computer-implemented instructions to the computer to display and/or distribute those URLs and gather bid inputs corresponding to the published URLs, thereby triggering the computer to execute various tasks described herein.

In step 202, the computer samples webpages associated with bid-requests, by scraping the webpages located at the URLs published in the bidstream. This Internet-centric approach allows for efficient scraping and identification of keywords, beacon terms, or fingerprints associated with the third-party content to generate future scores associated with campaign content.

In step 203, the scraping algorithm may create individual corpus snapshots for each URL, comprising various types of webpage data for the webpages corresponding to the URLs. In step 204, the webserver stores the individual corpus snapshots into a corpus database (e.g., corpus database 105). One having skill in the art will appreciate that there may be one or more computer-implemented techniques to capture or scrape the content of webpages and store the content into the corpus database. In some implementations, the content may be updated according to crawler software routines that programmatically traverse URLs or webpages and download the content of webpages according to algorithm logic of the crawler software. And in some implementations, the corpus database may be updated by a computing device of the system using data captured during a live bidding process, where webpages to be updated or URLs to such webpages may be received from a bidding system via a bidstream.

Figure 3:
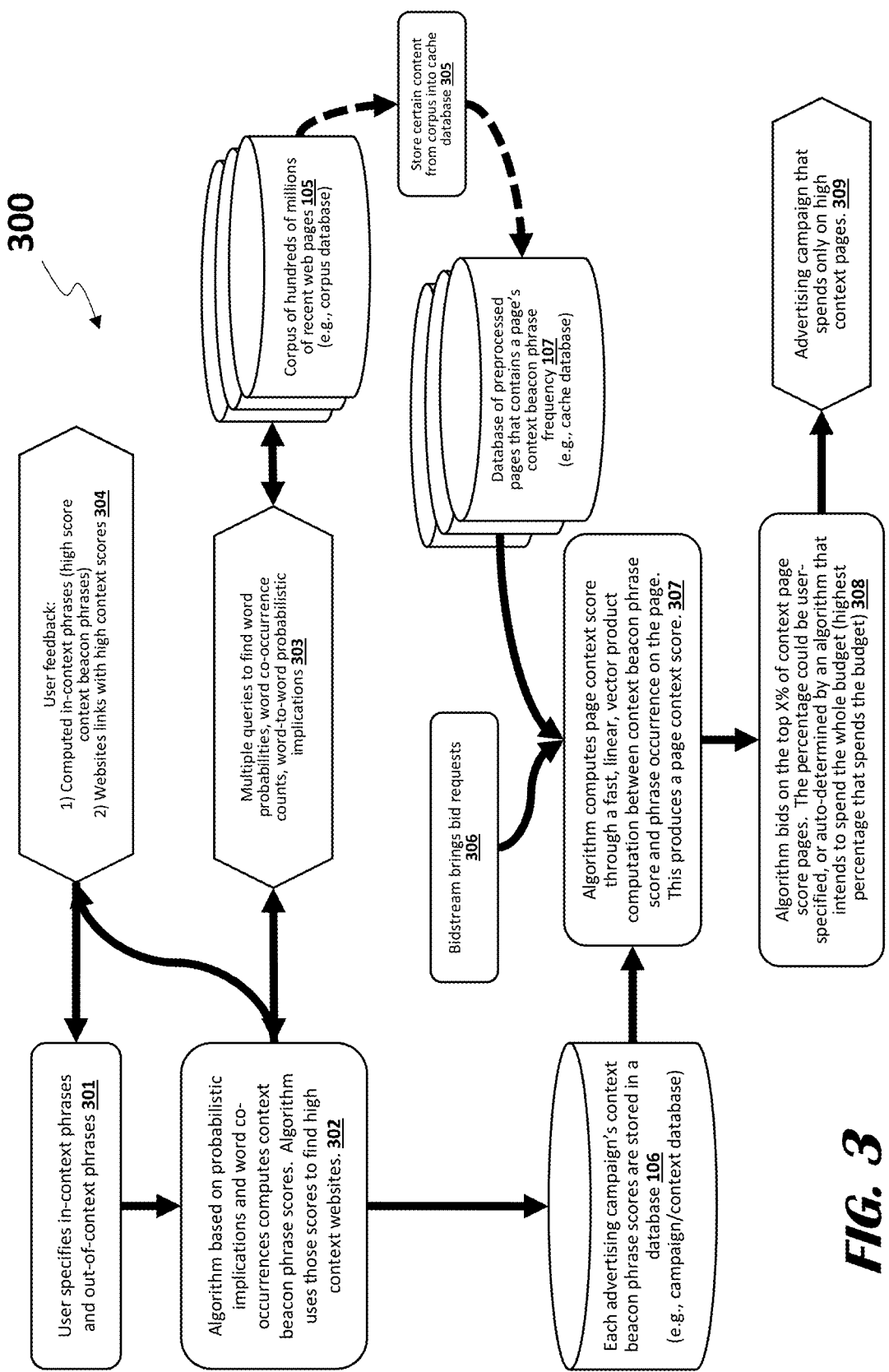
FIG. 3 illustrates a flow chart for identifying the context of a campaign and correlating the campaign content with third-party Internet content.

FIG. 3 shows a flowchart of execution steps for identifying the context of a campaign and correlating the campaign content with third-party Internet content, according to an example method 300 embodiment. Although the method 300 is described with respect certain computing devices and databases, it should be appreciated that any number computing devices may be involved in other embodiments, including additional or alternative computing devices from computing devices and databases mentioned herein. It should also be appreciated that certain embodiments may provide for additional or alternative steps, or omit certain steps, from the steps of the method 300, and still fall within the scope of this disclosure.

In a first step 301, a computer hosts a website that receives inputs from a client computer of an end-user (e.g., content generator) for defining a new content delivery campaign or for updating a previously generated campaign. The inputs may include input phrases, which may be in-context phrases and/or out-of-context phrases, where each phrase may comprise any number of words. This step 301 may include identifying specific beacon phrases associated with the campaign, which are phrases contextually related to the input phrases that are automatically identified based on the input phrases. The system may receive in-context terms that the user has indicated are within the context of the desired search. The inputs may typically include keywords (one or more words) entered by the user, such is the case in the method 300. But in some implementations, the inputs from a user may include website URLs, or fingerprints for media (e.g., audio, visual, audiovisual) content having a high context correlated with the campaign content.

Users often want to place their campaign content in a specific context. For example, an insurance company that may find that its campaigns perform best when placed next to an article primarily about bad and stormy weather. As another example, a backpack company may want to place their campaign content on pages that have to do with adventure travel. Contextualizing, as used herein, is a process of placing campaign content in third-party Internet content that has relevant context. As one example, inputs for the context, or in-context words or phrases, of a campaign may include "winter storm," "icy conditions," and "flood warning."

Inputs received from the user, in current step 301 or in later steps may also specify out-of-context terms (as further described below), which are terms that are out of context with the campaign. Based on the algorithmic scores discussed herein for the input phrases (e.g., in-context phrases, out-of-context phrases), the computer determines or updates a list of identified beacon phrases contextually relevant to the user's campaign.

The system calculates and assigns context scores to particular terms, such as making the word "heat" more important than the word "hurricane." In some implementations, the system may calculate and assign context scores for out-of-context terms to make these out-of-context terms more or less important. The context scores may be decimal numbers, and may be assigned automatically or based on user preferences. In some circumstances, system may apply a default context score, or manually assign context scores that are the same for similar terms. For example, the terms "heat" and "hot" could receive the same context score.

Figure 5:
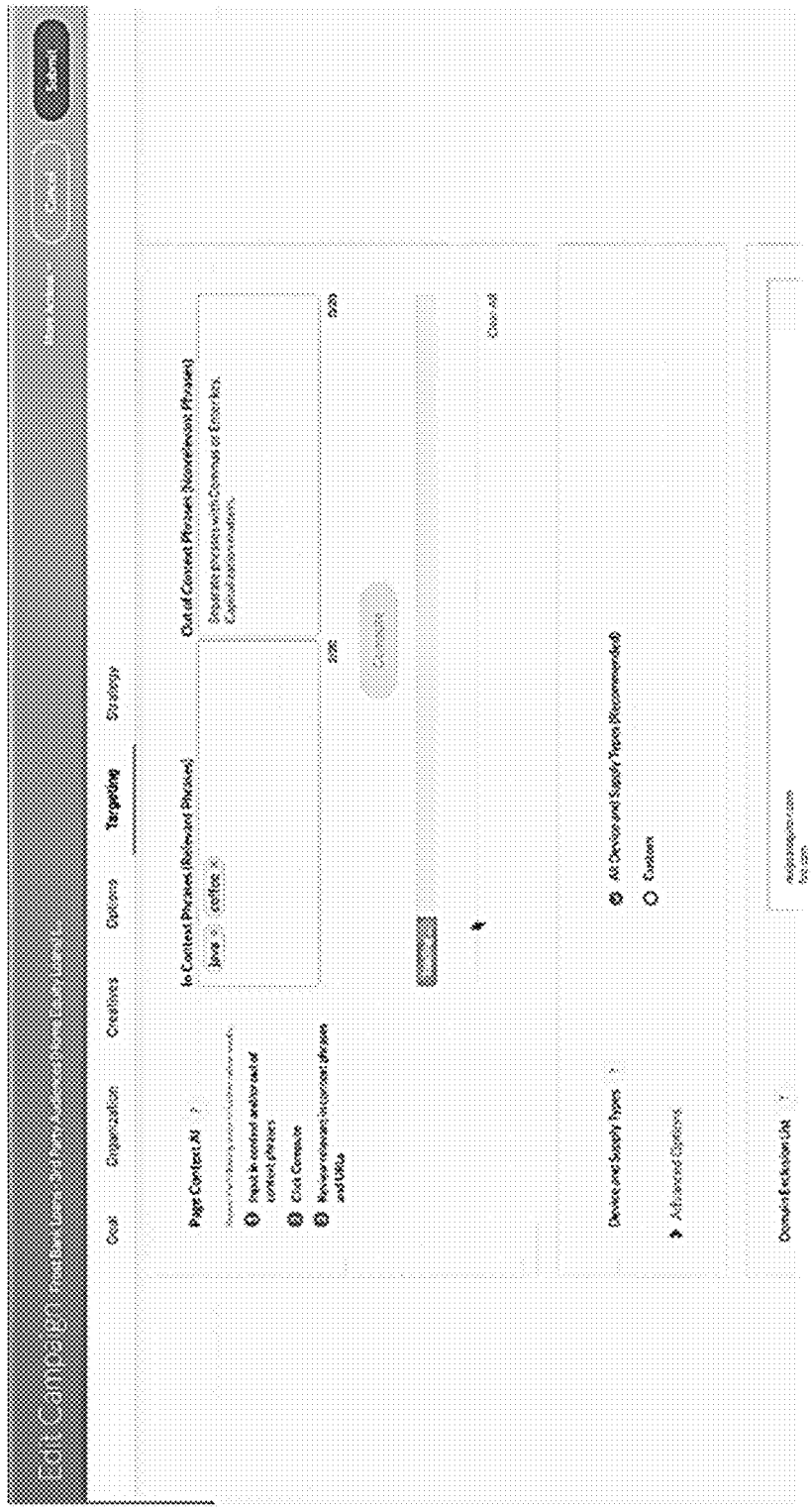
FIGS. 5-8 show example webpages allowing users to manage and update context-building operations of the system, according to an embodiment.

Based on the in-context and out-of-context terms received from the user, the algorithm of step 302 may calculate context scores for content in the corpus database 105 based on probabilistic implications, word co-occurrences, and context scores. The algorithm of step 302 may use those context scores to find high context websites. As shown in FIG. 5, a webpage 500 of the web site hosted by the computer includes inputs allowing the user to input a set of context phrases. The webpage 500 includes input boxes allowing the user to input in-context and out-of-context phrases.

Referring back to FIG. 3, the algorithm of step 302 computes word probabilities, word co-occurrence counts, and word-to-word probabilistic implications using the input phrases. The system may determine campaign context scores for terms such as, phrases, keywords, or fingerprints, based on probabilistic implications and word co-occurrences. The system uses those scores to generate context scores for webpages to identify high-context websites. In step 302, the system queries the corpus database 105 to determine word probabilities, word co-occurrence counts, and/or word-to-word probabilistic implications, to identify beacon phrases that are relevant to the campaign. Based on such queries to the corpus database 105, the computer may generate beacon phrases and page context scores, and, in some implementations, may retrieve URLs and other electronic content that has a high context score.

Continuing with the weather and adventure travel examples, the results of step 302 could be as follows:

In the weather example—in which a user entered "winter storm," "icy conditions," and "flood warning," as in-context phrases—the computer uses these in-context phrases to query the pre-stored webpage content in the corpus database 105, to compute beacon phrases based on the corpus content. In this example, the computer returns the following beacon phrases: "weather service," "national weather," "nws," "storm warning," "snowfall," "sleet," "coastal flood," and "wind gusts."

In the adventure travel example—in which the user entered "flight," "adventure," "travel," and "hotel," as in-context phrases—the computer uses these in-context phrases to query the pre-stored webpage content in the corpus database 105, to compute beacon phrases based on the corpus content. In this example, the computer returns the following beacon phrases: "skyscann," "airfare," "layover," "booking.com," "rebook," "hostel," "expedia," "tsa pre-check," "icelandair," "carryon," "itinerary," and "Ryanair."

In step 304, the computer identifies high-context webpages based on the beacon phrases and the input phrases, and then generates a user feedback display that displays to the user the resulting URLs having a high-context to the campaign.

For instance, in the weather example, after the computer has queried the corpus database 105, and calculated the beacon phrases, the phrase scores, and the page context scores, the computer returns, via a user feedback display, the following list of URLs of webpages calculated as having a high context score:

https://www.mlive.com/weather/2018/01/heres_a_snowfall_tally_on_mich.html
https://www.chicagotribune.com/news/breaking/ct-first-snowfall-chicago-2016-htmlstory html
https://www.masslive.com/weather/2016/11/these_are_the_10_snowiest_citi.html
https://www.express.co.uk/showbiz/tv-radio/1151582/snowfall-season-3-how-many-episodes-are-in-snowfall-fx-series-damson-idris
https://www.express.co.uk/showbiz/tv-radio/1151561/Snowfall-season-3-cast-Who-is-in-the-cast-of-Snowfall-FX-series-Damson-Idris
https://www.theactivetimes.com/snow/n/14-cities-get-most-snowfall
https://www.tripsavvy.com/does-it-ever-snow-in-memphis-2321876
https://www.denverpost.com/2019/09/08/colorado-weather-september-snowfall-denver/amp/
https://www.mlive.com/weather/2018/05/and_the_winner_of_michigans_wi.html
https://minecraft.gamepedia.com/snowfall
https://seat42f.com/tv-review-snowfall.html
https://www.denverpost.com/2019/05/04/colorado-weather-front-range-late-season-snow
https://www.denverpost.com/2019/05/10/denver-weather-below-average-snowfall Likewise, in the adventure travel example, after the computer has queried the corpus database 105, and calculated the beacon phrases, the phrase scores, and the page context scores, the computer returns, via a user feedback display, the following list of URLs of webpages calculated as having a high context score:

https://www.annees-de-pelerinage.com/the-best-hotels-in-machu-picchu-for-any-budget
https://www.drinkteatravel.com/train-to-machu-picchu-tickets/https://www.forbes.com/sites/geoffwhitmore/2018/04/03/how-to-book-aer-lingus-award-flights-to-ireland-for-cheap
https://traveltips.usatoday.com/closest-airport-machu-picchu-109221.html
http://www.travelfuntu.com/insider-info/airports-that-offer-free-city-tours
https://www.whereverwriter.com/15-things-machu-picchu
https://traveltips.usatoday.com/closest-airport-machu-picchu-109221.html
https://www.thebrokebackpacker.com/best-hostels-in-cinque-terre-italy/https://www.thebrokebackpacker.com/best-hostels-in-koh-lanta-thailand/
https://travel-made-simple.com/layover-long-enough/

When the user is presented with the user feedback display containing the resulting campaign contextualization results (e.g., beacon phrases, URLs for high-context webpages, scores), the user may refine the campaign through the webportal. The user's refinement feedback is entered to the computer, via a GUI on the client device of the user, allowing a user to, for example, select or deselect, or otherwise enter inputs indicating, in-context phrases (high score context phrases), beacon phrases identified by the computer, or out-of-context phrases (low score context phrases). The user's GUI may also include inputs for selecting or deselecting, or otherwise entering inputs indicating, website URLs with high or low context scores, respectively.

Figure 6:
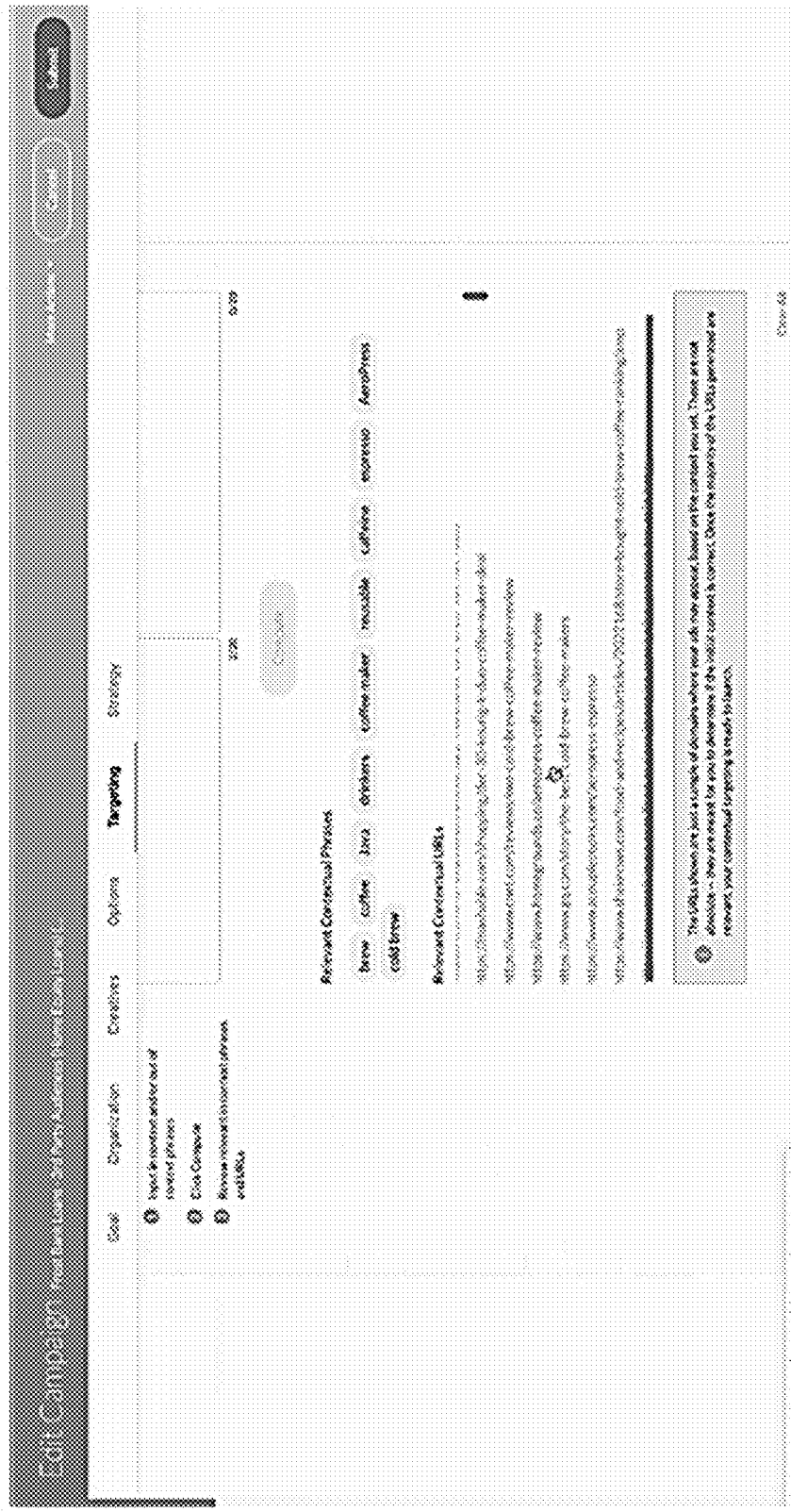

With reference to FIG. 6, the webpage 600 displays contextual phrases identified based upon the user inputs (shown in FIG. 5) and relevant URLs for contextual webpages identified by the computer based upon the user's earlier inputs.

As illustrated by FIG. 3, the contextualizing campaign-building processes may be iterative. In particular, through iterations of prior steps 301-304, the user may refine and confirm aspects of the contextualized campaign data, including a set of in-context phrases, a set of beacon phrases, a set of out-of-context phrases, a set of URLs of high-context webpages, and the various computed scores, which together define the contextualized search parameters the user would like to deploy for the user's content delivery campaign. In some cases, there may be a predetermined number of iterations; and in some cases, a user can iterate until the user is satisfied. The finalized campaign data may be stored into a context database 106 (sometimes referred to as a "campaign database").

For instance, in the weather example, the user may refine the campaign by entering out-of-context phrases. In this example, the user may decide that heat advisories and hurricanes are not relevant forms of extreme weather conditions, so the user may enter "heat," "heat advisory," and "hurricane," as out-of-context phrases. The computer again queries the corpus database 105 using the user-selected input phrases to generate revised context beacon phrases and high-context webpages. In this example, the computer produces the following updated list of context beacon phrases: "snowfall," "snowstorm," "wintry," "icy," "snowcover," "snow," "snowy," "caltran," spotter," and "commute." The computer further produces and displays to the user, the following updated list of URLs:

https://www.mlive.com/weather/2018/01/heres_a_snowfall_tally_on_mich.html
https://www.chicagotribune.com/news/breaking/ct-first-snowfall-chicago-2016-htmlstory.html
https://www.masslive.com/weather/2016/11/these_are_the_10_snowiest_citi.html
https://www.express.co.uk/showbiz/tv-radio/1151582/snowfall-season-3-how-many-episodes-are-in-snowfall-fx-series-damson-idris
https://www.express.co.uk/showbiz/tv-radio/1151561/Snowfall-season-3-cast-Who-is-in-the-cast-of-Snowfall-FX-series-Damson-Idris
https://www.theactivetimes.com/snow/n/14-cities-get-most-snowfall
https://www.tripsavvy.com/does-it-ever-snow-in-memphis-2321876
https://www.denverpost.com/2019/09/08/colorado-weather-september-snowfall-denver/amp/
https://www.mlive.com/weather/2018/05/and_the_winner_of_michigans_wi.html
https://minecraft.gamepedia.com/snowfall
https://seat42f.com/tv-review-snowfall.html
https://www.denverpost.com/2019/05/04/colorado-weather-front-range-late-season-snow
https://www.denverpost.com/2019/05/10/denver-weather-below-average-snowfall In the travel example, the user may also refine the campaign by entering out-of-context phrases. In this example, the user may decide that TSA precheck and airline websites are irrelevant, so the user may enter "TSA Precheck," "Precheck," "TSA," "airline," and "airline hub," as out-of-context phrases. The computer again queries the corpus database 105 using the user-selected input phrases to generate revised context beacon phrases and high-context webpages. In this example, the computer produces the following updated list of context beacon phrases: "skyscann," "airfare," "layover," "booking.com," "rebook," "hostel," "expedia," "icelandair," "carryon," "itinerary," and "ryanair." The computer further produces and displays to the user, the following updated list of URLs:

https://www.annees-de-pelerinage.com/the-best-hotels-in-machu-picchu-for-any-budget
https://www.drinkteatravel.com/train-to-machu-picchu-tickets/
https://www.forbes.com/sites/geoffwhitmore/2018/04/03/how-to-book-aer-lingus-award-flights-to-ireland-for-cheap
https://traveltips.usatoday.com/closest-airport-machu-picchu-109221.html
http://www.travelfuntu.com/insider-info/airports-that-offer-free-city-tours
https://www.whereverwriter.com/15-things-machu-picchu
https://traveltips.usatoday.com/closest-airport-machu-picchu-109221.html
https://traveltips.usatoday.com/closest-airport-machu-picchu-109221.html
https://www.thebrokebackpacker.com/best-hostels-in-cinque-terre-italy/
https://www.thebrokebackpacker.com/best-hostels-in-koh-lanta-thailand/
https://www.thebrokebackpacker.com/best-hostels-in-koh-lanta-thailand
https://travel-made-simple.com/layover-long-enough/

The user may indicate, via a GUI, that the iterative campaign contextualization building process is complete. In response, the computer is instructed to store finalized campaign data (e.g., in-context terms, beacon terms, scores, high-context page URLs) into the context database 106. In some implementations, the prior iterative steps 301-304 may be implemented again later by the user, even after a campaign is begun or otherwise deployed, to further improve or refine the campaign contextualization. Therefore, in such implementations, storing the campaign data into the context database 106 does not mean the campaign is immutable.

Figure 7:
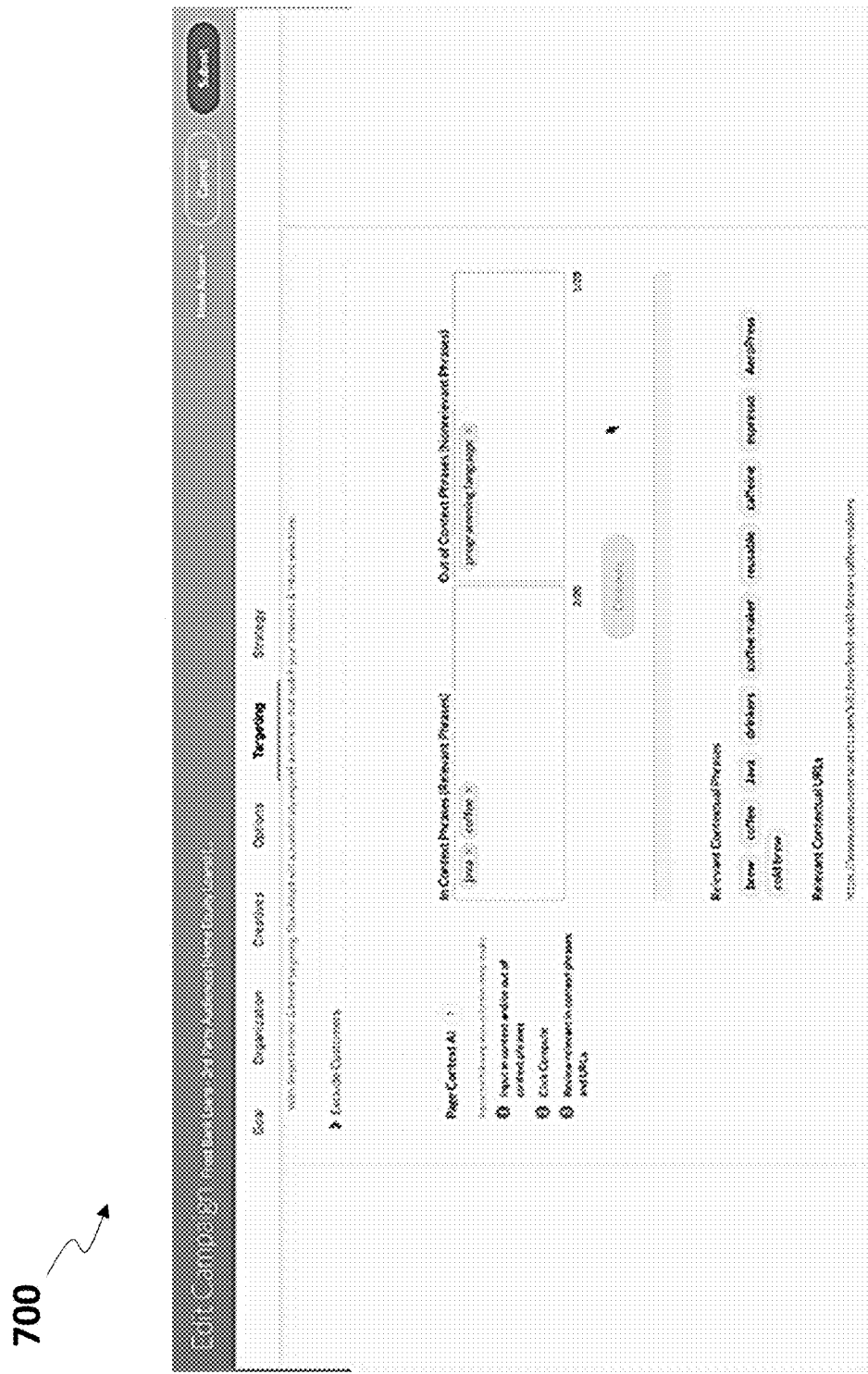
Figure 8:
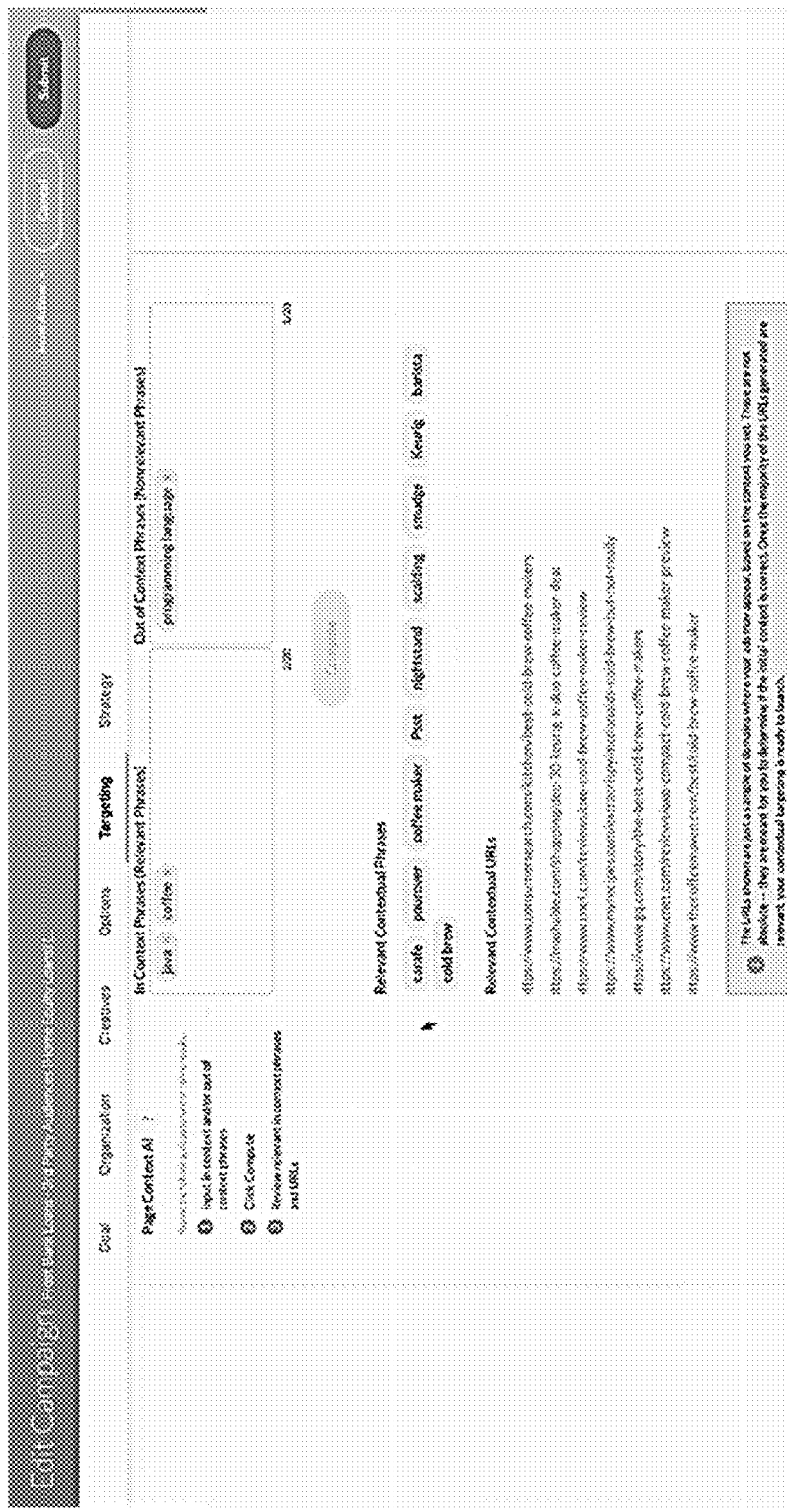

With reference to FIG. 7, the webpage 700 displays the input boxes again, allowing the user another opportunity to update/refine the contextual phrases and contextual webpages. The computer displays the webpage 700 in response to the computer receiving instructions from the client device, via the GUI display, to perform another iteration for generating contextual phrases and contextual webpages. In FIG. 8, the webpage 800 updates and displays the contextual phrases identified by the computer based upon the updated user inputs (shown in FIG. 8) and relevant URLs for contextual webpages identified by the computer based upon the user's earlier inputs.

In some embodiments, a computing device (e.g., the computer hosting the website) generates context data based upon the user inputs and feedback received from a client device, where the context data is displayed the user on the GUI (e.g., browser, webpage) of the client device. The additional information about a specified context (e.g., context data) includes, for example but not limited to, the scores calculated based upon the user inputs, the terms identified based upon the user inputs, the fraction of webpages with a positive context score or a list of webpages at a particular context score range. The computer (or other computing device) generates the context data for various aspects of the user's campaign, terms/phrases, webpages (e.g., contextual webpages, corpus webpages, cached webpages), and/or other aspects of the system. The context data for each webpage may include any statistical information that is extracted or calculated by the computer at any point of the method 300, or before, during, or after the method 300. The computer updates data records of the various databases of the system according to calculated or re-calculated context data.

Referring back to FIG. 3, in optional step 305, certain content stored in the corpus database 105 may be stored into a cache database 107. The content stored into the cache database 107 can include the most frequently requested webpages (or other data content) that are the subject of competitions, as such information (e.g., number of requests) is determined by the computer or received from the RTB server. By minimizing the volume of data in the cache database 107, the computer can more efficiently execute processes executed at bid-time, such as the following steps 306-309. The content to be stored into the cache database 107 may be selected automatically or manually by, for example, an administrator selection entered as a configuration into the computer directly or from an administrator computing device. For instance, the computer may select a certain webpage when the webpage has been requested some threshold number of times from the RTB at bid-time; and/or the computer may automatically select the webpage or content when such webpage is not in the cache database 107. To further improve computer efficiency when executing bid-time processes, a webpage may be converted or otherwise stripped of unnecessary data when the webpage is stored in the cache database 107. It should be appreciated that optional step 305 may be performed before, during, or after the method 300.

In step 306, at bid-time the computer receives a bidstream of bid requests from a server of the RTB service, initiating the user's content delivery campaign. The bidstream contains one or more URLs of webpages for which content generators, such as the user in the process 300, compete to host their content. In the following steps 307-309, the computer executes automated processes, based on the users' contextualized campaign data, to compete on behalf of the user and deliver the users' content to the third-party servers hosting the desirable URLs.

In step 307, using the same or similar algorithm as in prior step 302 (e.g., a fast, linear, vector product computation between a campaign's context score and term occurrence on pages) and using the campaign data (e.g., in-context phrases, out-of-context phrases, beacon phrases) stored in the context database 106, the computer calculates beacon phrase scores and page context scores for the webpages that have been published in the bidstream by the RTB. The computer matches the URLs (of available webpages) published in the bidstream with URLs in the cache database 107 to quickly calculate webpage context scores of the available webpages and identify which webpages having the highest context scores, signaling those webpages most contextually relevant to the user's campaign data.

In current step 307, by executing the same or similar algorithm that generated a beacon phrase score (as in prior steps 307-309), the computer may compute page scores for the webpage URLs published by the RTB, and a context score for each of the context phrases on a particular webpage; where the computation of the context scores may include calculating the probabilities of word co-occurrence, geometric means, and expected numbers of occurrences versus actual occurrences. A "context beacon phrase scores" may be computed based on, at least in part, the probabilistic implications, geometric means, and co-occurrence counts of the phrases of the user's campaign data across webpages of the cache database 107 or otherwise published by the RTB service. A "context score" of a particular webpage may be computed based on, at least in part, the number of times beacon phrases and/or in-context phrases occur on webpage, fractions of instances that each word appears on the webpage, and the beacon phrase score of the beacon phrases. In some implementations, the computer computes the context scores for webpages quickly in real-time at bid-time, whereas the computer computes the context beacon phrase scores may be more computationally intensive (and slower) before bid-time when the campaign is deployed for competition. The result of current step 307 is that the computer produces a webpage score for a particular webpages stored in the cache database 107. The webpages may be "ordered" by their webpage context score.

Based on the user's input phrases and beacon phrases, the ultimately calculated webpage scores target specific keywords or demographics, and therefore the webpage scores may be customized per campaign. In some cases, webpage scores may be grouped for use with specific verticals, such as automotive, insurance, consumer electronics, toys, healthcare, and government, among others. These grouped webpage scores can be reused for similar campaigns.

In step 308, the computer bids, on behalf of the user, on the top X % of available webpage URLs or otherwise having a webpage score above a predetermined threshold score. The threshold percentage could be predetermined by the user, an administrator, or automatically by an algorithm that intends to spend the whole budget (highest percentage that spends the budget). The computer may generate a GUI displaying the end-user those webpages having high context scores, and where the computer delivers their content for publication. The computer may implement any number of additional or alternative bid-volume thresholds to control or cap the number (volume) of bids submitted.

Campaigns typically have specified budgets, and the campaign length and budget may determine the value of X % (or other condition acting as the bid-volume threshold). In step 309, the system bids on only the context pages that meet the bid threshold requirements. The algorithm may automatically select the percentile to spend the budget on most in-context pages, but the X % value may also be manually predetermined. As such, when the system receives a request for bids, it may read the page scores for the Internet content associated with the bid request, and determine whether the page scores for that Internet content exceeds the percentile X % for each campaign (or other priority order condition). If the page score exceeds the bid threshold, the system may bid on placing campaign content on the Internet content.

Sometimes there may be a conflict between two campaigns on the system bidding for the same placement. In these situations, the system may use different approaches. In one embodiment, the system may use a round-robin arbitration method, giving each campaign an opportunity to bid on the placement. In another embodiment, the bid amount may vary depending on the delta between the page score and the X % for each campaign. The campaign that fits the placement best will win. Embodiments also include a hybrid approach. For example, if a campaign A is winning bids much more frequently than campaign B, then campaign B could be given an opportunity to win a bid after a predetermined number of winning bids for campaign A. For example, campaign B will make a higher bid after campaign A wins 9 bids. Other embodiments include basing the bid price on some other aspect of the bid-request/campaign combination, for example a prediction of the click-through rate, and selecting the campaign with the greatest bid price.

In addition to the page score, the computer (or other computing device of the system) in some embodiments, receives or calculates a performance score that defines the likelihood that a placement of campaign content will be viewed or clicked-through or engaged with. A click-through rate represents the number or rate/ratio that a user clicked on the campaign content, whereas engagement may be determined by other means, such as whether a user scrolled through content, viewed content for a predetermined time (e.g., 15 seconds), clicked on anything in the campaign content, or viewed predetermined portions of the campaign content, such as additional audio or video content. The computer or other device of the system is configured to track this information using various cookies or other programming of third-party host servers and/or receive this information as tracked from the bid server or third-party host servers. The computer or other device of the system may therefore compute a performance score for a bid request before making a bid. The computer transmits bids when the performance score satisfies a pre-configured threshold performance score. The performance score may be a measure of the level of interest a viewer of the Internet content will have in the campaign content, and then, in some cases, the system may bid high or low for that bid request based on the performance score. For instance, the higher the performance score, the higher the system could be willing to bid on it, and the lower the performance score, the lower the system could be willing to bid on the page. As such, the high-bid or low-bid value determination may function as a varied performance score thresholds. The system may also consider many other factors about the bid request; for example, the time of the request, the location of the server the bid request came from, the IP address of the bid requester, the bid requester's past performance scores and payments, the likelihood that the bid requester will accept the bid, the terms of payment for the bid, and the like.

Figure 4:
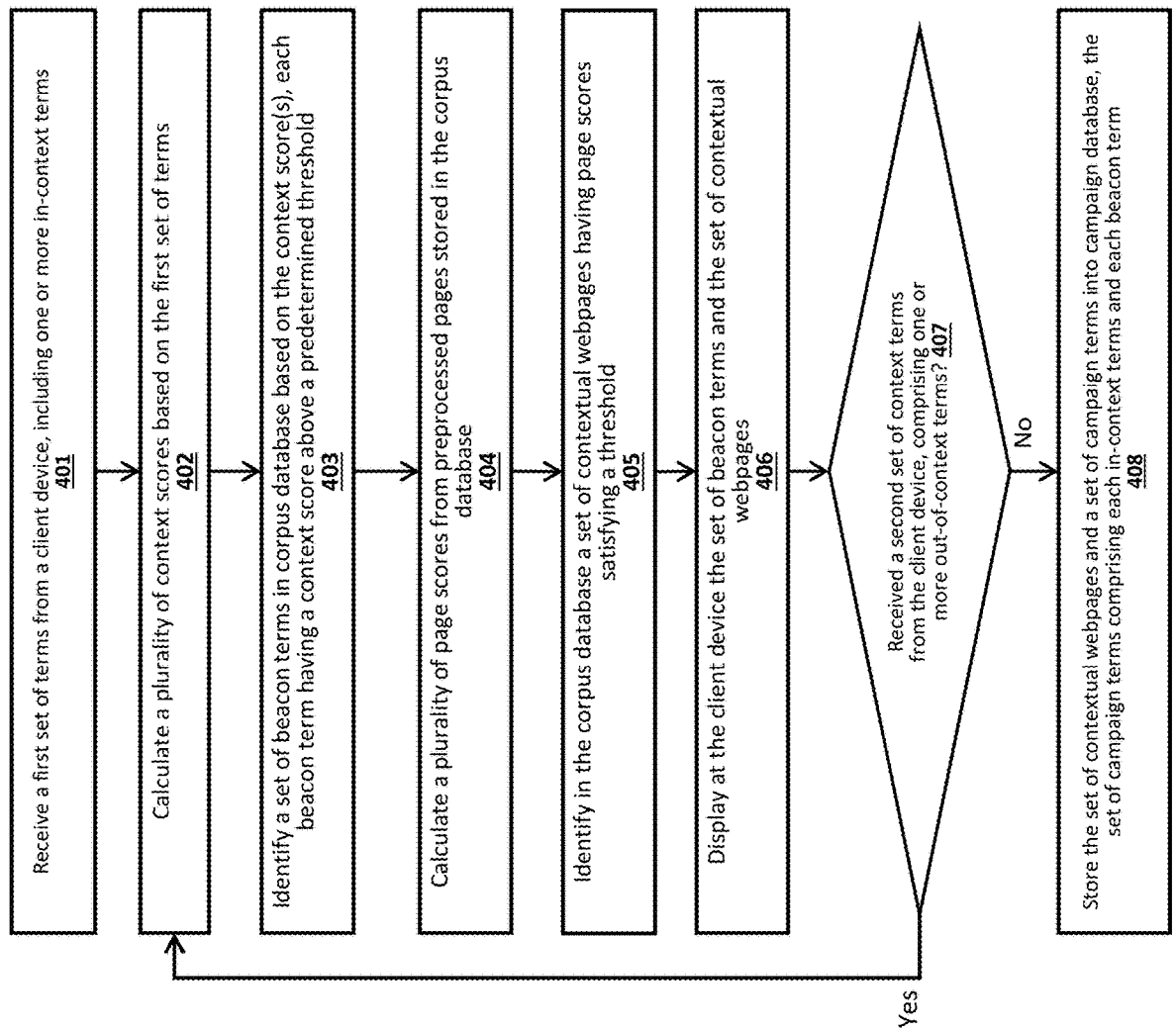
FIG. 4 illustrates a flow chart of a method in accordance to one embodiment.

FIG. 4 illustrates a method 400 in accordance with one embodiment. Step 401 includes receiving a first set of terms from a client device, the first set comprising one or more in-context terms. Embodiments may also allow for receiving out-of-context terms at this step. The method further comprises at step 402, calculating a plurality of context scores based on the first set of terms. The context scores may represent the importance or lack of importance of particular terms relative to other terms. At step 403, the method may identify a set beacon terms in a corpus database based on the context score, each beacon term having a context score above a predetermined threshold. The beacon terms may be related to the terms received in step 401. The method may further include step 404, during which the method may calculate a plurality of page scores from preprocessed pages stored in the corpus database. The page scores, as described previously, determine the importance of a particular piece of Internet content for a campaign based on context and page scores. Step 404 includes identifying in the corpus database a set of contextual webpages having page scores satisfying a threshold. As previously describe, this may be a series of URLs that the system identified as having particular relevance. Next, in step 405, the method may transmit data to display at the client device the set of beacon terms and the set of contextual webpages. A user at the client device may assess whether the set of contextual webpages are accurate. If not, in step 405, the system may receive a second set of context terms from the client device, the second set comprising one or more out-of-context terms. The system may re-calculate the page score based on the first set of context terms and the second set of context terms, thereby generating an updated page score, as illustrated in step 406. Based on this re-calculation, step 407 may update the set of beacon terms and the set of contextual webpages based on the updated page score. Step 408 may include storing the set of contextual webpages and a set of campaign terms into a campaign database (sometimes referred to as a "context database"), the set of campaign terms comprising each in-context phrase and each beacon term.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware may be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   prior to a bid-time and after training a machine-learning model,
   applying, by a computer, the machine-learning model to a first set of context terms received from a client device to output a set of beacon terms extracted from a plurality of corpus terms stored in a corpus database, wherein the machine-learning model is trained on the plurality of corpus terms stored in the corpus database, wherein the machine-learning model determines a plurality of co-occurrence probabilities corresponding to the plurality of corpus terms indicating a probability that one or more context terms co-occurs with one or more corpus terms, and wherein the machine-learning model extracts each beacon term from each corpus term satisfying a threshold co-occurrence probability;
   calculating, by the computer, a plurality of page scores for a plurality of corpus webpages stored in the corpus database based upon the set of beacon terms satisfying the threshold co-occurrence probability and the first set of context terms;
   identifying, by the computer, in the plurality of corpus webpages a set of contextual webpages having page scores satisfying a threshold;
   applying, by the computer, the machine-learning model to the first set of context terms and a second set of context terms received from the client device to output an updated set of beacon terms;
   calculating, by the computer, one or more updated page scores for one or more corpus webpages stored in the corpus database based upon the updated set of beacon terms, the first set of context terms, and the second set of context terms;
   updating, by the computer, the set of contextual webpages based upon the one or more updated page scores; and
   storing, by the computer into a campaign database, campaign data of a user comprising the set of beacon terms and the set of contextual webpages, the campaign data configured for executing at a future bid-time a real-time bidding selection operation for one or more available webpages during the real-time bidding selection operation.

2. The method according to claim 1, wherein applying the machine-learning model to the first set of context terms to output the set of beacon terms from the corpus database includes:
   extracting, by the computer, one or more embeddings for the first set of context terms, wherein the set of beacon terms comprises one or more corpus terms in the corpus database having a feature vector satisfying a threshold distance from the one or more embeddings for the first set of context terms.

3. The method according to claim 2, further comprising:
   calculating, by the computer, a context score for each context term in the first set of context terms is based upon at least one of: a word probability, a word co-occurrence count, and a word-to-word probabilistic implication, wherein each embedding of each context term for identifying the one or more beacon terms is based upon the context score for the context term.

4. The method according to claim 3, further comprising:
   setting, by the computer, each context score as a default score for each context term; and
   adjusting, by the computer, the context score for the context term in accordance with one or more user inputs.

5. The method according to claim 2, further comprising:
   requesting, by the computer, webpage data of a webpage comprising page content and metadata according to a uniform resource locator (URL); and
   storing, by the computer, the webpage data into the corpus database as a preprocessed page, the preprocessed page stored into a data record for the preprocessed page, the data record comprising at least a portion of the page content and the metadata, a timestamp, the URL, and one or more content tags.

6. The method according to claim 1, wherein the first set of context terms comprises at least one out-of-context term.

7. The method according to claim 1, further comprising:
   generating, by the computer, context data for the set of contextual webpages based upon one or more user inputs received from the client device; and
   transmitting, by the computer, the context data to the client device for display at a graphical user interface (GUI) of the client device.

8. The method according to claim 1, wherein the computer receives each context term from the client device via a query configuration webpage.

9. The method according to claim 1, further comprising, at the bid-time:
   receiving, by the computer, from a bid server an availability list of one or more available webpages requesting bids from a bid system; and
   calculating, by the computer, a real-time page score for each available webpage in the availability list based, at least in part, upon a number of occurrences of one or more campaign terms comprising the set of updated beacon terms and one or more in-context terms in the available webpage.

10. The method according to claim 9, further comprising:
    identifying, by the computer, a bidding-list of webpages comprising each of the available webpages of the availability list satisfying the bid threshold.

11. A system comprising:
    a corpus database comprising non-transitory storage medium configured to store at least a portion of a plurality of Internet content data corresponding to a uniform resource locator (URL) and page context score;

a campaign database comprising non-transitory storage medium configured to store campaign data for a plurality of users, the campaign data configured for executing a real-time bidding selection operation for one or more available webpages during the real-time bidding selection operation; and a server comprising a processor configured to:
at a bid time and after training a machine-learning model,
apply the machine-learning model to a first set of context terms received from a client device to output a set of beacon terms extracted from a plurality of corpus terms stored in the corpus database, wherein the machine-learning model is trained on the plurality of corpus terms stored in the corpus database, wherein the machine-learning model determines a plurality of co-occurrence probabilities corresponding to the plurality of corpus terms indicating a probability that one or more context terms co-occurs with one or more corpus terms, and wherein the machine-learning model extracts each beacon term from each corpus term satisfying a threshold co-occurrence probability;
calculate a plurality of page scores for a plurality of corpus webpages stored in the corpus database based upon the set of beacon terms satisfying the threshold co-occurrence probability and the first set of context terms;
identify in the plurality of corpus webpages a set of contextual webpages having page scores satisfying a threshold;
apply the machine-learning model to the first set of context terms and a second set of context terms received from the client device to output an updated set of beacon terms;
calculate one or more updated page scores for one or more corpus webpages stored in the corpus database based upon the updated set of beacon terms, the first set of context terms, and the second set of context terms;
update the set of contextual webpages based upon the one or more updated page scores; and
store, into the campaign database, campaign data of a user comprising the set of beacon terms and the set of contextual webpages, the campaign data configured for executing at a future bid-time a real-time bidding selection operation for one or more available webpages during the real-time bidding selection operation.

12. The system according to claim 11, wherein the server is further configured to:
generate context data for the set of contextual webpages based upon one or more user inputs received from the client device; and
transmit the context data to the client device for display at a graphical user interface (GUI) of the client device.

13. The system according to claim 11, wherein, when applying the machine-learning model to the first set of context terms to output the set of beacon terms from the corpus database, the server is further configured to:
extract one or more embeddings for the first set of context terms, wherein the set of beacon terms comprises one or more corpus terms in the corpus database having a feature vector satisfying a threshold distance from the one or more embeddings for the first set of context terms.

14. The system according to claim 11, wherein the server is further configured to, at the bid-time:
receive from a bid server an availability list of one or more available webpages requesting bids from a bid system; and
calculate a real-time page score for each available webpage in the availability list based, at least in part, upon a number of occurrences of one or more campaign terms comprising the set of updated beacon terms and one or more in-context terms in the available webpage.

15. A computer readable medium containing machine-executable program instructions, wherein execution of the program instructions by one or more processors of a computer system causes the one or more processors to execute the steps of:
prior to a bid-time and after training a machine-learning model,
applying the machine-learning model to a first set of context terms received from a client device to output a set of beacon terms extracted from a plurality of corpus terms stored in a corpus database, wherein the machine-learning model is trained on the plurality of corpus terms stored in the corpus database, wherein the machine-learning model determines a plurality of co-occurrence probabilities corresponding to the plurality of corpus terms indicating a probability that one or more context terms co-occurs with one or more corpus terms, and wherein the machine-learning model extracts each beacon term from each corpus term satisfying a threshold co-occurrence probability;
calculating a plurality of page scores for a plurality of corpus webpages stored in the corpus database based upon the set of beacon terms satisfying the threshold co-occurrence probability and the first set of context terms;
identifying in the plurality of corpus webpages a set of contextual webpages having page scores satisfying a threshold;
applying the machine-learning model to the first set of context terms and a second set of context terms received from the client device to output an updated set of beacon terms;
calculating one or more updated page scores for one or more corpus webpages stored in the corpus database based upon the updated set of beacon terms, the first set of context terms, and the second set of context terms;
updating the set of contextual webpages based upon the one or more updated page scores; and
storing, into a campaign database, campaign data of a user comprising the set of beacon terms and the set of contextual webpages, the campaign data configured for executing at a future bid-time a real-time bidding selection operation for one or more available webpages during the real-time bidding selection operation.

16. The computer readable medium of claim 15, wherein the one or more processors further executing the steps of:
extracting one or more embeddings for the first set of context terms, wherein the set of beacon terms comprises one or more corpus terms in the corpus database having a feature vector satisfying a threshold distance from the one or more embeddings for the first set of context terms.

17. The computer readable medium of claim 16, wherein the one or more processors further executing the steps of:

calculating a context score for each context term in the first set of context terms is based upon at least one of: a word probability, a word co-occurrence count, and a word-to-word probabilistic implication, wherein each embedding of each context term for identifying the one or more beacon terms is based upon the context score for the context term.

18. The computer readable medium of claim 17, wherein the one or more processors further executing the steps of:
setting each context score as a default score for each context term; and
adjusting the context score for the context term in accordance with one or more user inputs.

19. The computer readable medium of claim 15, wherein the one or more processors further executing the steps of:
generating context data for the set of contextual webpages based upon one or more user inputs received from the client device; and
transmitting the context data to the client device for display at a graphical user interface (GUI) of the client device.

20. The computer readable medium of claim 15, wherein the one or more processors further executing the steps of at the bid-time:
receiving, by the computer, from a bid server an availability list of one or more available webpages requesting bids from a bid system; and
calculating, by the computer, a real-time page score for each available webpage in the availability list based, at least in part, upon a number of occurrences of one or more campaign terms comprising the set of updated beacon terms and one or more in-context terms in the available webpage.

* * * * *